United States Patent
Paulik et al.

(10) Patent No.: US 9,418,660 B2
(45) Date of Patent: Aug. 16, 2016

(54) CROWD SOURCING AUDIO TRANSCRIPTION VIA RE-SPEAKING

(71) Applicant: Cisco Technology, Inc., San Jose, CA (US)

(72) Inventors: Matthias Paulik, San Jose, CA (US); Vivek Halder, Cupertino, CA (US); Ananth Sankar, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 14/156,032

(22) Filed: Jan. 15, 2014

(65) Prior Publication Data

US 2015/0199966 A1    Jul. 16, 2015

(51) Int. Cl.
| | |
|---|---|
| *G10L 15/26* | (2006.01) |
| *G06Q 10/06* | (2012.01) |
| *G10L 15/04* | (2013.01) |
| *G10L 25/87* | (2013.01) |
| *G10L 15/32* | (2013.01) |
| *G10L 15/07* | (2013.01) |

(52) U.S. Cl.
CPC .......... *G10L 15/26* (2013.01); *G06Q 10/06311* (2013.01); *G10L 15/04* (2013.01); *G10L 15/07* (2013.01); *G10L 15/32* (2013.01); *G10L 25/87* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 9,026,446 | B2* | 5/2015 | Fiumi | ............. | G10L 15/32 340/541 |
| 2006/0126821 | A1* | 6/2006 | Sahashi | ............. | G06F 17/289 379/387.01 |
| 2006/0149558 | A1* | 7/2006 | Kahn | ............. | G10L 15/063 704/278 |
| 2008/0319743 | A1* | 12/2008 | Faisman | ............. | G10L 15/065 704/235 |
| 2012/0016671 | A1* | 1/2012 | Jaggi | ............. | G10L 15/22 704/235 |

OTHER PUBLICATIONS

Lasecki et al., Online Quality Control for Real-Time Crowd Captioning, Oct. 22-24, 2012, ACM 978-1-4503-1321-6.*

* cited by examiner

*Primary Examiner* — Barbara Reinier
(74) *Attorney, Agent, or Firm* — Parker Ibrahim & Berg LLC; James M. Behmke; Stephen D. LeBarron (57) ABSTRACT

Speech audio that is intended for transcription into textual form is received. The received speech audio is divided into first speech segments. A plurality of speakers is identified. A speaker is configured for repeating in spoken form a first speech segment that the speaker has listened to. A subset of speakers is determined for sending each first speech segment. Each first speech segment is sent to the subset of speakers determined for the particular first speech segment. The second speech segments are received from the speakers. The second speech segment is a re-spoken version of a first speech segment that has been generated by a speaker by repeating in spoken form the first speech segment. The second speech segments are processed to generate partial transcripts. The partial transcripts are combined to generate a complete transcript that is a textual representation corresponding to the received speech audio.

11 Claims, 4 Drawing Sheets

CROWD SOURCING AUDIO TRANSCRIPTION VIA RE-SPEAKING

TECHNICAL FIELD

This disclosure relates to audio transcription.

BACKGROUND

Many systems transcribe speech to text. To improve the accuracy of each transcription a system may be trained.

DESCRIPTION OF EXAMPLE EMBODIMENTS

Overview

Some implementations may provide a computer-program product that is embedded in a non-transitory machine-readable medium and stores instructions that are executable by a processor and configured to cause the processor to perform operations for crowd sourcing audio transcription using crowd-sourcing. The operations include: receiving a speech audio intended for transcription to textual form; dividing the received speech audio into first speech segments; identifying a plurality of speakers, where a speaker is configured for repeating in spoken form a first speech segment that the speaker has listened to; determining a subset of speakers for sending each first speech segment; sending each first speech segment to the subset of speakers determined for the particular first speech segment; receiving second speech segments from the speakers, where a second speech segment is a re-spoken version of a first speech segment that has been generated by a speaker by repeating in spoken form the first speech segment that the speaker has listened to; processing the second speech segments to generate partial transcripts, where a partial transcript is a textual representation of a corresponding second speech segment; and combining the partial transcripts to generate a complete transcript that is a textual representation corresponding to the received speech audio.

DETAILED DESCRIPTION

Techniques are described for converting audio to text. A system performs this conversion by splitting the audio file into segments and sending each of the segments to number of speakers. Each speaker repeats the segment of the audio file. The system performs speech recognition on the repeated segment and combines the text of those segments to form the text of the original audio. For example, an audio file may contain the audio of a person speaking "the dog ate my homework." The system can segment the audio file into three segments. The first segment may contain audio for "the dog." The second segment may contain "ate my." The third segment may contain my "homework." The system may send the first segment to a first speaker and a second speaker, the second segment to a third speaker and a fourth speaker, and the third segment to a fifth speaker, a sixth speaker, and a seventh speaker. The system performs speech recognition on each of the segments as spoken by each of the speakers. The system may then identify possible transcripts of the first segment as "the dog," the second segment as "ate my," and the third segment as "homework." Thus the system identifies a possible transcript of the entire sentence as "the dog ate my homework."

Figure 1:
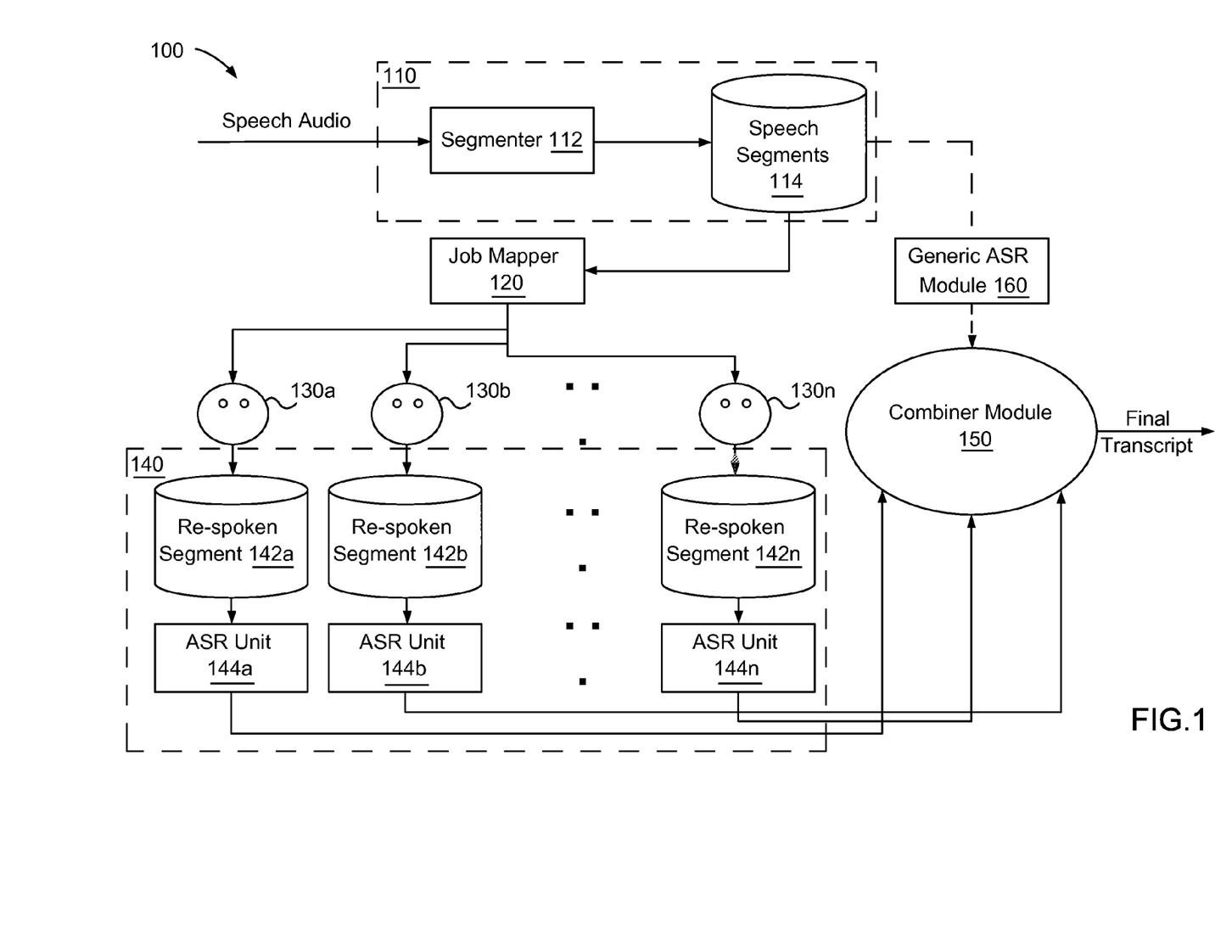
FIG. 1 illustrates an example system for transcribing audio via re-speaking.

FIG. 1 illustrates an example system 100 for transcribing audio via re-speaking. In general, the system 100 receives speech audio and outputs a final transcript of the words spoken in the speech audio. The system 100 receives speech audio at the segmenter module 110 and segments the speech audio into segments. The segmenter module 110 sends the segments to a job mapper 120. The job mapper 120 sends the segments to speakers 130 that each re-speak a segment. Some of the speakers 130 re-speak the same segment as other speakers 130. The system 100 sends the re-spoken segments to speech recognition units 144. The speech recognition units 144 preform speech recognition on the re-spoken segments. The combiner module 150 receives the transcripts produced by the speech recognition units 144 and combines them into a final transcript.

The segment module 110 contains a segmenter 112 that segments the received speech audio. The segmenter 112 creates segments of the received speech audio. In some implementations, the segments each contain a word of the speech audio. For example, if the speech audio was "call me back" then the first segment would be "call," the second segment would be "me," and the third segment would be "back." In some implementations, the segments each contain a particular number of words. For example, each segment may contain three words. In some implementations, the segmenter 112 segments the speech audio into a particular number of segments. For example, the segmenter 112 may divide the speech audio into five segments. In some implementations, the segmenter 112 segments the speech audio into sentence size segments. For example, the segmenter 112 may divide the speech audio into segments based on a location of natural pauses that may indicate the end of a sentence. A natural pause may be a particular period of time where there is no speech. For example, dividing the speech audio based on periods of one second where there is no speech. In some implementations, the particular period of time where there is no speech may be variable. For example, if the speech audio may contain pauses of one second, one half a second, one quarter second, and one half a second. The segment module may select the median pause length or the mean pause length and segment the speech audio based on the selected pause length such that pause lengths over or equal to the selected pause length indicate the ends or each segment. In some implementations, the segments may each be a particular length of time. For example, each segment may be ten seconds long.

The segmenter 112 stores the segments in speech segments 114. The speech segments 114 may be any type of computer readable storage device. In some implementations, the segmenter 112 stores each speech segment with a marker. For example, the segmenter 112 may mark each speech segment with a unique marker indicating the original speech, marker indicating the speech segment number, and a marker indicating total number of speech segments from the particular speech audio. If the speech audio was "the dog ate my homework" segmented into "the dog," "ate my," and "homework," then the "the dog" may contain the markers "23" to uniquely identify the source speech audio, "3" to indicate the total number of segments from the original speech audio, and "1" to indicate the segment number.

The job mapper 120 receives the segments from the speech segments 114. The job mapper 120 identifies a group of speakers that are capable of re-speaking an audio segment. The job mapper 120 identifies a subset of the group of speakers to receive a particular audio segment and then sends the particular audio segment to the subset. Continuing the example of "the dog ate my homework," the job mapper 120 may identify speakers 130a, 130b, 130c, 130d, 130e, and 130f and then determine to send the segment "ate my" to speakers 130a, 130b, and 130c for re-speaking. In some implementations, the job mapper 120 may send each segment to all the identified speakers.

In some implementations, the job mapper 120 examines a user profile that is associated with the speaker and uses the user profile to determine whether to send a segment to the speaker. A user profile may indicate the sex of the speaker and the age of the speaker. In this instance, the job mapper 120 may determine to send each segment to an equal number of male and female speakers who are in various age ranges. If speaker 130a is a twenty-five year old male, speaker 130b is a forty-nine year old female, speaker 130c is a 43 year old female, speaker 130d is a sixty-six year old male, speaker 130e is a seventy year old male, and speaker 130f is a nineteen year old female, then the job mapper 120 may determine to send the "ate my" segment to speaker 130a, speaker 130b, and speaker 130e in order to achieve a diverse group of re-speakers. Alternatively, the job mapper 120 may determine to send the "ate my" segment to speaker 130a, speaker 130d, and speaker 130e if the job mapper 120 determines to send the segment to all male speakers.

In some implementations, the job mapper 120 examines information gathered from previous re-speaking jobs and uses that information to determine which segments to send to which speakers. The information may include the average time that a re-speaker takes to re-speak a segment, the gender of the speaker as detected by the system 100, an accent of the speaker as detected by the system 100. The job mapper 120 may determine to send the segments to speakers that re-speak the segment in under two hours. The job mapper 120 may determine to send each segment to at least three speakers who each have a different accent. The job mapper 120 may determine to send each segment to at least one speaker of each gender as the gender is determined by the system 100.

In some implementations, the job mapper 120 examines the characteristics of each segment. The information may include the signal to noise ratio of the segment, the length of the segment, and the gender, age, and accent of the person speaking the segment. The job mapper 120 may determine to send the segments that have a signal to noise ratio below a particular threshold to more speakers. For example, the job mapper 120 may determine to send segments that have a signal to noise ratio between 5 decibels and 10 decibels to ten speakers and send segments that have a signal to noise ratio between 10 decibels and 15 decibels speakers. The job mapper may determine to send segment to speakers that are different in gender, age, and accent than the person speaking the segment. For example, if the person speaking the segment is determined by the system 100 to be a female between the age of forty and fifty with a southern United States accent, then the job mapper 120 may determine to send the segment to at least one male, at least one speaker who is about twenty years younger and a speaker who is about twenty years older, and at least person who has a slight or no accent.

The speakers 130 receive one or more segments from the job mapper to re-speak. In some implementations, the speakers 130 are people. The speakers 130 may be paid on the basis of the number of re-speaking assignments they accept and complete. The speakers 130 may be assigned re-speaking tasks by the job mapper 120 or they may select re-speaking tasks that are made available to them by the job mapper 120. For example, a speaker 130c may be assigned the segments "ate my" and "call" and may be responsible for re-speaking those segments. Alternatively, the job mapper 120 may make available segments "ate my" and "call" to speakers 130a, 130c, and 130d and those speakers may be free to accept those segments or not.

The system 100 stores each re-spoken segment in the speech recognition module 140. The speech recognition module 140 contains the re-spoken segments 142. The re-spoken segments 142 are converted to text by the ASR units 144. The re-spoken segments 142 are stored in a computer readable store device.

In some implementations, the ASR (automatic speech recognition) units 144 are unique for each speaker 130. For example, ASR unit 144b may perform speech recognition for speaker 130b. In some implementations, the ASR units 144 may be trained using the respective re-spoken speech segments from the speakers 130. For example, ASR unit 144b may be trained using re-spoken speech segments from the speakers 130b. Alternatively, the system 100 may contain less ASR units than the number of speakers. For example, the system may contain one hundred speakers and thirty ASR units. The system 100 may also contain only one ASR unit. In some implementations, the ASR units 144 maintains the unique identifiers added by the segmenter module 110. Furthermore, the ASR units 144 may add data identifying the characteristics of the speakers 130 to the text of each re-spoken segment. In some implementations, different ASR units are cross-adapted. For example, the outputs of ASR unit 144a may be used to train and adapt ASR unit 144c.

The system 100 sends the text outputted from the ASR units 144 to the combiner module 150. The combiner module 150 combines the text outputted form the ASR units 144 into a final transcript that represents the text of the speech audio. The combiner module 150 will be described in more detail in the discussion about FIG. 3.

In some implementations, the system 100 includes a generic ASR module 160. The generic ASR module 160 receives audio speech segments from the segment module 110. The generic ASR module 160 performs speech recognition on the received segments and sends text of the segments to the combiner module 150. In some implementations, the generic ASR module 160 is not trained based on the speakers 130. In some implementations, the generic ASR module 160 is trained based on the received audio speech segments. In some implementations, the combiner module 150 uses the text received from the generic ASR module 160 in determining the final transcript of the speech audio.

Figure 2:
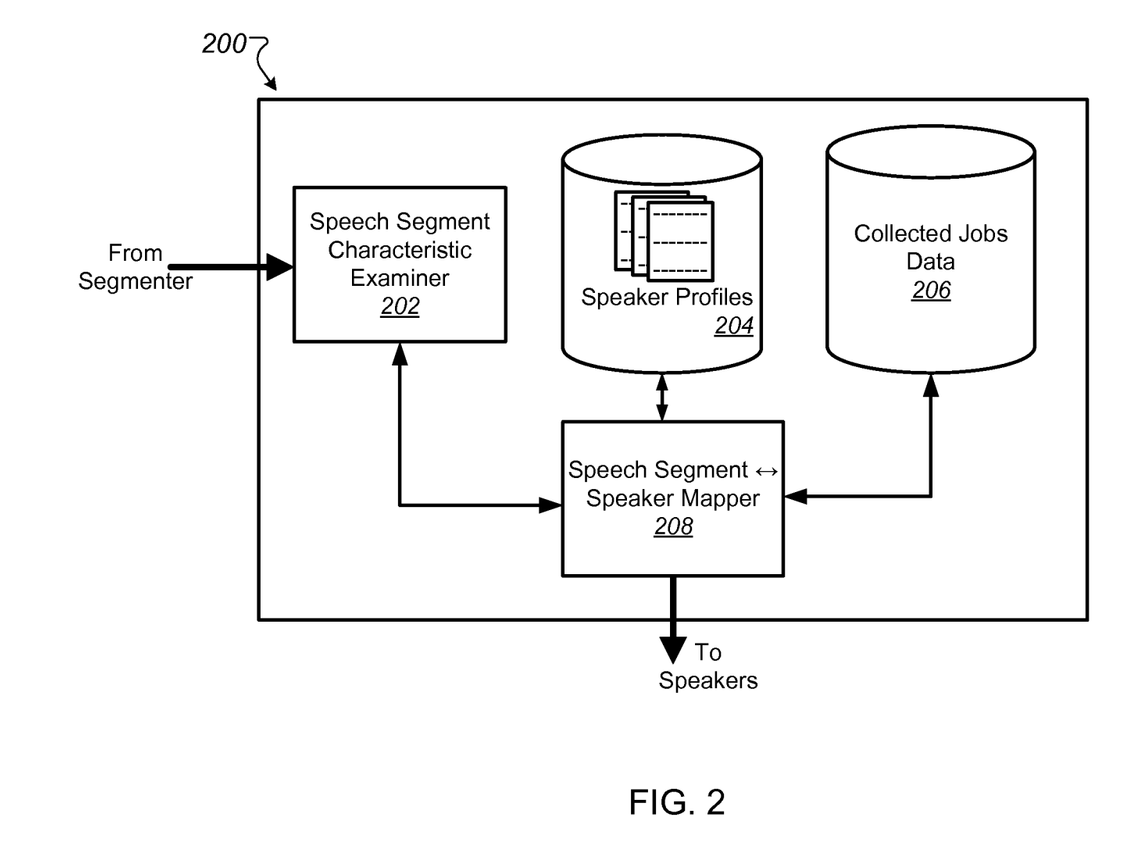
FIG. 2 illustrates an example system for the job mapper.

FIG. 2 illustrates an example system for the job mapper 200. In general, the job mapper 200 receives segmented speech audio from the segmenter and determines the speakers that should receive each segment of speech audio and sends the segments to the speakers. The speech segment character examiner 202 receives the segments and identifies the characteristics of each segment. The speech segment character examiner 202 sends the segment and the identified characteristics to the speech segment speaker mapper 208. The speech segment speaker mapper 208 receives data from the speech segment characteristic examiner 202, the speaker profiles 204 and the collected jobs data 206. The speaker profiles 204 contains data received from the speakers about the speakers. The collected jobs data 206 contains data that the system collected regarding the speakers. The speech segment speaker mapper 208 uses the information received to send each segment to the appropriate speakers.

The speech segment character examiner 202 receives segments from the segmenter and identifies characteristics of each segment. The speech segment character examiner 202 may determine the signal to noise ratio of each segment as well as other audio metrics such as sampling rate. The speech segment character examiner 202 may also attempt to identify the gender, age range, and accent of the segment speaker. The speech segment character examiner 202 can attach these characteristics to the speech segment. The age range may be in ten year ranges. For example, the speech segment character examiner 202 may identify a segment speaker at between 20 and 29. The accent may be selected from a group of accents that the speech segment character examiner 202 is able to identify.

The speaker profiles 204 contains data related to the profiles provided by the speakers. The speakers may provide their gender, age, native language, date of birth, or any other relevant information. The speaker profiles 204 may be contained in a database such that the system 100 can access all speakers with an age of 60 or who have a native language of Spanish or who are between 25 and 34 and whose native language is English. The speaker profiles 204 may also contain data related to which speakers are currently performing re-speaking jobs and which ones may not be performing re-speaking jobs. Furthermore, the speaker profiles 204 may contain data related to how many re-speaking jobs the speakers wish to perform in a given period of time. For example, the speaker profiles 204 may indicate that a particular speaker wishes to perform about fifty re-speaking jobs in a week.

The collected jobs data 206 contains data collected by the system when the speakers perform a re-speaking jobs. The collected jobs data 206 may contain data such as the average time that a speaker takes to perform a re-speaking job, any data associated with the gender of the speaker, any data related to an accent of the speaker, and any data related to a perceived age of the speaker. The collected jobs data 206 may also contain data related to the performance of each speaker. For example, if the audio segment was "dog ate" and the system or a person reviewing the re-spoken audio determines that the speaker said "cat drank" then that would be noted in the collected jobs data 206. The collected jobs data 206 may contain the total number of re-speaking jobs performed by each speaker and the average number of re-speaking jobs performed in a particular period of time. For example, the collected jobs data 206 may indicate that a speaker has performed 284 total re-speaking jobs and averaged twenty-three completed re-speaking jobs per week. The collected jobs data 206 may also contain data indicating the number of re-speaking jobs pending for each speaker. For example, if a speaker has accepted and not completed four re-speaking jobs, then that data will be noted. Additionally, if the system has assigned one or more re-speaking jobs, then that data will be noted.

The data from the speech segment characteristic examiner 202, the speaker profiles 204, and the collected jobs data 206 is compiled by the speech segment speaker mapper 208. The speech segment speaker mapper 208 uses the compiled data to determine which speakers to send each segment to. In some implementations, the speech segment speaker mapper 208 may send each segment to all the available speakers. In some implementations, the speech segment speaker mapper 208 may use the complied data to send each segment to a diverse group of speakers. In some implementations, the speech segment speaker mapper 208 may send each segment to a specific number of speakers. In some implementations, the speech segment speaker mapper 208 may send each speech segment to a speakers that complete the re-speaking job within a particular period of time. In some implementations, the speech segment speaker mapper 208 may select more speakers than needed for each segment and wait until the needed number accepts before withdrawing the segment. For example, the speech segment speaker mapper 208 may determine that four speakers should re-speak "ate my." The speech segment speaker mapper 208 may select ten potential speakers that fit the desired profile for speakers. The speech segment speaker mapper 208 will wait until four speakers have accepted the re-speaking job, then no longer offer that job to the other six speakers. The speech segment speaker mapper 208 may use any combination of these when selecting speakers for each segment.

Figure 3:
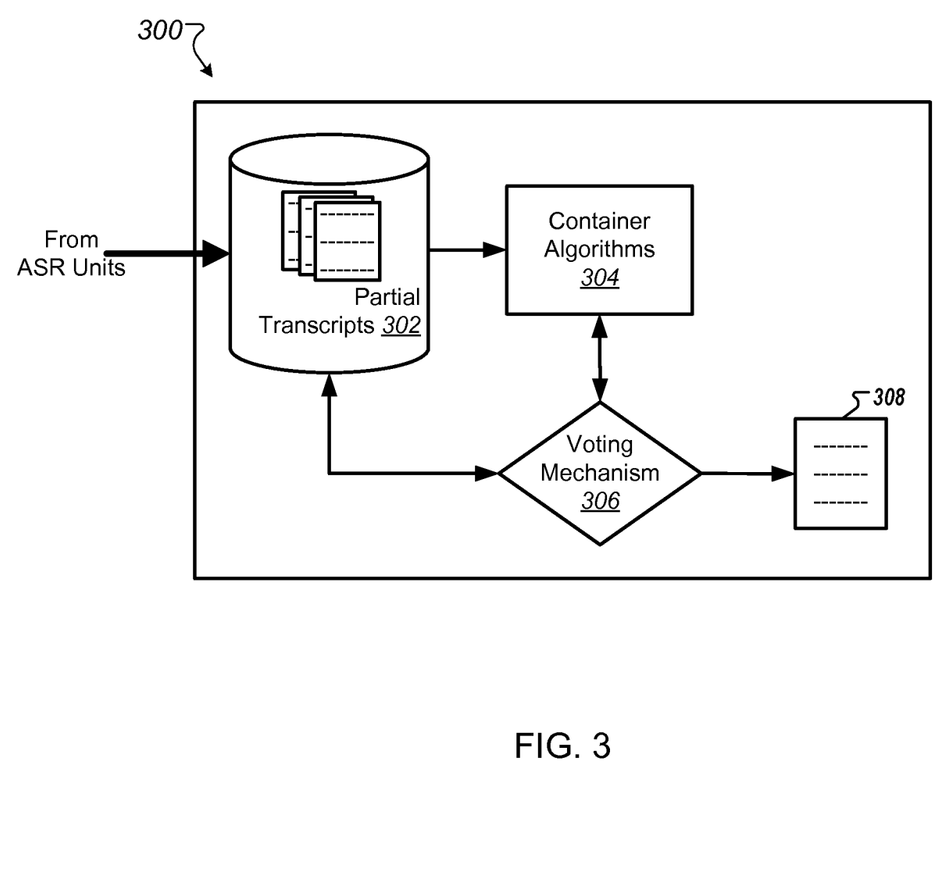
FIG. 3 illustrates an example system for the combiner module.

FIG. 3 illustrates an example system for the combiner module 300. The combiner module 300 receives text of the segments from the ASR units. The text of the segments are stored in the partial transcripts 302. The combiner module 300 uses the container algorithms 304 and a voting mechanism 306 to determine the final transcripts 308 that represent the original speech audio.

The system utilizes the container algorithms 304 to arrange each segment into container form. The container contains all instances of recognition output for a given speech segment. The voting mechanism 306 selects portions of the segments from the arrangement of the segments and combines the segments into the final transcript for that segment. Finally, the system combines the various final segment transcripts to create the final transcript for the original speech audio. In some implementations, the portions of the segments are based on words. For example, if the segment from one of the ASR units is "ate my homework," then each partial segment based on words would be "ate," "my," and "homework." In some implementations, the voting mechanism 306 is performed on a per-word basis. The voting mechanism 306 may select the transcript that is the most popular among the speakers. For example, if the transcript for one of the partial segments from each of the speakers was "ate," "ate," "ape," "quaint," and "ate," then the voting mechanism 306 would select "ate" as the final transcript for that partial segment.

In some implementations, the container algorithms 304 contains the ROVER algorithm. In the ROVER algorithm, the first-best output of an individual ASR unit is used. The ROVER algorithm uses a word by word voting scheme to determine the individual final partial segment transcripts. Thus, if "ate" is the most popular transcript for a particular word from the speech audio, then the ROVER algorithm would select that word. Alternatively, the ROVER algorithm can vote using interpolation of word confidences. The system then combines the word-by-word final partial segments to create the final segment transcript. In some implementations, the container algorithms 304 contains confusion network combination. In the confusion network combination algorithm, the first best hypotheses or first best outputs are replaced by individual confusion networks for each ASR unit. In some implementations, the container algorithms 304 contains word lattices. The system combines word lattices and derives a confusion network based on the word lattices. In this instance, the first best hypothesis becomes the ASR unit output. In some implementations, confusion networks are not used. Instead, minimum Bayes risk decoding on the combined lattices may be used. In some implementations, the ASR units' models are combined in a log-linear manner to decode the first best path in, for example, the word lattice that was constructed by combining the individual ASR units' word lattices. The voting mechanism 306 selects the most likely transcript and outputs the final segment transcript. Finally, the different final segment transcripts are put together to form the final transcript 308.

Figure 4:
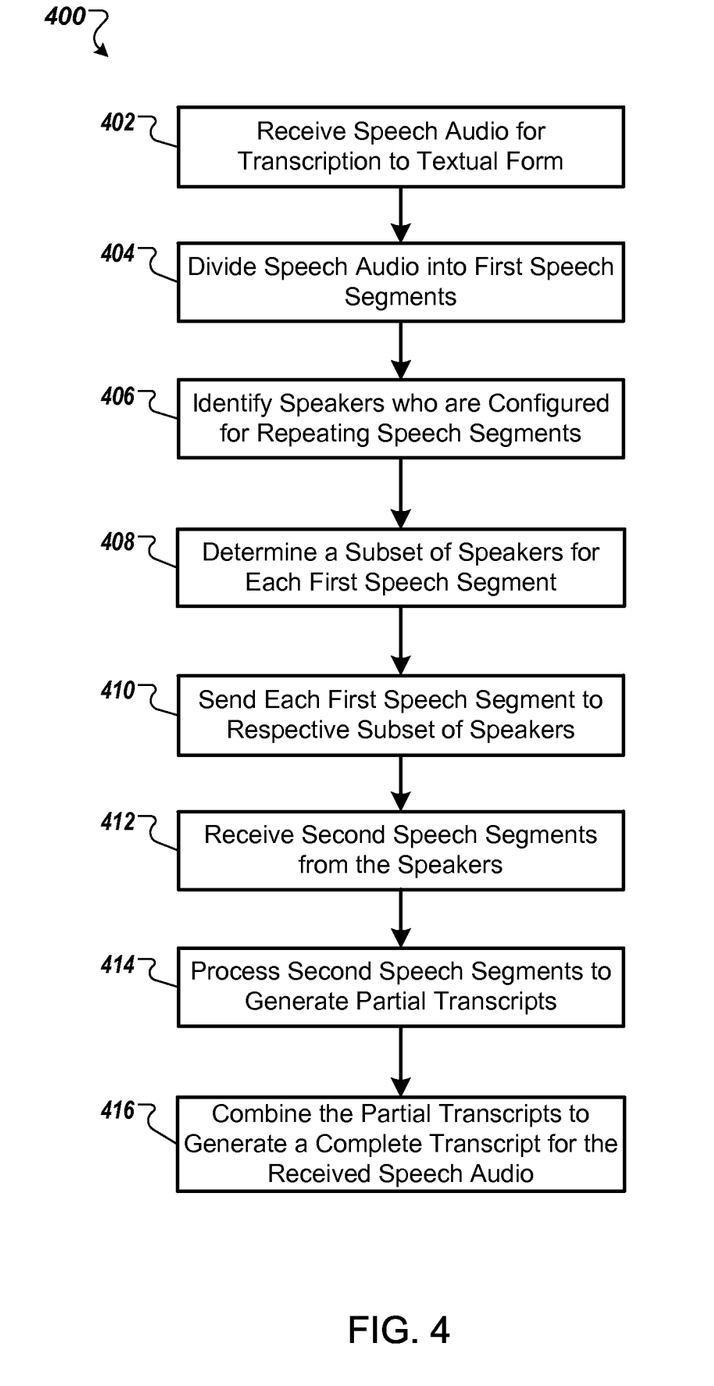
FIG. 4 illustrates an example process for transcribing audio via re-speaking.

FIG. 4 illustrates an example process 400 for transcribing audio via re-speaking. In general, the process 400 determines a transcript for speech audio by segmenting the speech audio and sending each segment to one or more speakers for re-speaking. The re-spoken segments are transcribed by an ASR unit paired with each speaker. The transcripts are then combined to form a final transcript. The process 400 will be described as being performed by a computer system comprising one or more computers, for example, the system 100 as shown in FIG. 1.

The system receives speech audio for transcription to textual form (402). The speech audio may be an audio file of any length and compressed using any algorithm that the system is capable of decoding. The system divides speech audio into first speech segments (404). In some implementations, the system divides the speech audio based on time. For example, the system may divide the speech audio into one minute segments. In some implementations, the system divides the speech audio up into segments of a particular number of words. For example, the system may divide the speech audio into fifty word segments. The system may count words based upon short areas of silence that are typically between words.

The system identifies speakers who are configured for repeating speech segments (406). The identified speakers may be those speakers who are willing to and available for repeating speech segments. The system determines a subset of speakers for each first speech segment (408). The system may determine the subset of speakers based on a profile of the speakers. The profile of the speakers may contain details about the speaker and is submitted by the speaker. The system may determine the subset of speakers based on data collected about the speakers from previous repeating jobs. The collected data may be related to the performance of the speakers, any perceived characteristics of the speakers, such as accent, gender, and age, any completion time data related to previous repeating jobs. The system may determine the subset of speakers based on the characteristics of the speech audio. The system may use the signal to noise ration of the speech audio or the signal to noise ratio of each segment when determining a subset of speakers. The system may also use the perceived age, gender, or accent of the speaker when determining a subset of speakers. The system may determine a subset of speakers to achieve a diverse group of speakers to repeat the segments.

The system sends each first speech segment to a respective subset of speakers (410). The respective subset of speakers repeats the respective first speech segment. The system receives second speech segments from the speakers (412). The second speech segments are segments that the speakers repeat. The system processes the second speech segments to generate partial transcripts (414). The system may have an ASR unit for each of the speakers and those ASR units may be trained by data from the respective speaker. Alternatively, the system may have fewer ASR units than speakers. In some implementations, there may be a particular number of speakers for one ASR unit. In some implementations, there may be a particular number of ASR units that process repeated segments from the speakers selected by the system.

The system combines the partial transcripts to generate a complete transcript for the received speech audio (416). The system combines the partial transcripts for each segment to determine the most likely transcription for the segment and combines the most likely transcriptions into a complete transcript. The system may arrange the partial transcripts into a container form and select portions of the partial transcripts from the container form using a voting mechanism. In some implementations, the portions may be based on a word and the voting mechanism may be performed on a per-word basis. In some implementations, the container form may be an n-best list, a word lattice, or a confusion network combination.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a speech audio intended for transcription to textual form at a job mapper on a data processing apparatus;
dividing, by the job mapper, the received speech audio into first speech segments;
identifying, by the job mapper, speakers for sending each first speech segment of the first speech segments;
sending, by the job mapper, each first speech segment to the speakers determined for a particular first speech segment;
receiving, at the job mapper, second speech segments from the speakers, wherein each second speech segment of the second speech segments is a re-spoken version of a first speech segment of the first speech segments that has been generated by one of the speakers by repeating in spoken form the first speech segment that the one of the speakers has listened to; and
processing, by the job mapper, the second speech segments to generate a complete transcript that is a textual representation corresponding to the received speech audio.

2. The method of claim 1, wherein each of the speakers are configured for repeating in spoken form the first speech segment that a respective speaker has listened to.

3. The method of claim 1, wherein processing the second speech segments to generate the complete transcript that is the textual representation corresponding to the received speech audio comprises:
processing the second speech segments to generate partial transcripts, wherein a partial transcript is a textual representation of a corresponding second speech segment; and
combining the partial transcripts to generate the complete transcript that is the textual representation corresponding to the received speech audio.

4. The method of claim 1, wherein identifying speakers for sending the each first speech segment of the plurality of first speech segments comprise:
examining information associated with a plurality of speakers that are collected based on previous jobs;
mapping the each first speech segment to the plurality of speakers based on examining the collected information; and
determining the speakers from the plurality of speakers.

5. The method of claim 4, wherein the collected information a speaker includes one or more of: an average time until the speaker provides a second speech segment, automatically-detected gender of the speaker, or accent of the speaker.

6. A system comprising:
one or more computers and one or more storage devices storing instructions that are operable, when executed by the one or more computers, to cause the one or more computers to perform operations comprising:
receiving a speech audio intended for transcription to textual form;
dividing the received speech audio into first speech segments;
identifying speakers for sending each first speech segment;
sending the each first speech segment of a plurality of first speech segments to the speakers determined for a particular first speech segment;
receiving second speech segments from the speakers, wherein each second speech segment of the second speech segments is a re-spoken version of a first speech segment of the first speech segments that has been generated by one of the speakers by repeating in spoken form the first speech segment that the one of the speakers has listened to; and
processing the second speech segments to generate a complete transcript that is a textual representation corresponding to the received speech audio.

7. The system of claim 6, wherein identifying speakers for sending the each first speech segment of the plurality of first speech segments further comprises:
identifying a plurality of speakers;
examining a user profile associated with each speaker;
mapping the each first speech segment to a subset of the plurality of speakers based on examining the user profiles; and
identifying the subset of the plurality speakers as the speakers for sending each first speech segment.

8. The system of claim 6, wherein identifying speakers for sending the each first speech segment of the plurality of first speech segments further comprises:
identifying a plurality of speakers;
examining characteristics of each first speech segment;
mapping the each first speech segment to a subset of the plurality of speakers based on examining the characteristics of the first speech segment; and
identifying the subset of the plurality speakers as the speakers for sending the each first speech segment.

9. The system of claim 8, wherein the characteristics of a person speaking the first speech segment include one or more of: a signal-to-noise ratio (SNR) of the first speech segment, a length of the first speech segment, gender of the person speaking the first speech segment, age of the person speaking the first speech segment, or accent of the person speaking the first speech segment.

10. The system of claim 6, wherein processing the second speech segments to generate the complete transcript that is the textual representation corresponding to the received speech audio comprises:
processing, by individual automatic speech recognition (ASR) units associated with different speakers that have been trained for the associated speakers, the second speech segments.

11. The system of claim 10, wherein processing the second speech segments to generate the complete transcript that is the textual representation corresponding to the received speech audio comprises:
storing the second speech segments received from the speakers; and
training the ASR units using the stored second speech segments.

* * * * *